United States Patent
Tsuda et al.

(10) Patent No.: US 6,525,797 B2
(45) Date of Patent: Feb. 25, 2003

(54) LIQUID CRYSTAL DISPLAY DEVICE AND ITS MANUFACTURE METHOD IN WHICH THE ALIGNMENT FILMS HAVING DIFFERENT CHARACTERISTICS

(75) Inventors: Hideaki Tsuda, Kawasaki (JP); Yoshio Koike, Kawasaki (JP); Hideo Chida, Kawasaki (JP); Shingo Kataoka, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/955,759

(22) Filed: Sep. 19, 2001

(65) Prior Publication Data

US 2002/0015126 A1 Feb. 7, 2002

Related U.S. Application Data

(63) Continuation of application No. PCT/JP00/00449, filed on Apr. 24, 2000.

(30) Foreign Application Priority Data

Mar. 19, 1999 (JP) .......................................... 11-076803

(51) Int. Cl.⁷ ...................... G02F 1/1343; G02F 1/1337
(52) U.S. Cl. ..................... 349/139; 349/130; 349/123
(58) Field of Search ................................ 349/139, 130, 349/123, 128, 129

(56) References Cited

U.S. PATENT DOCUMENTS

| 5,309,264 A | 5/1994 | Lien et al. | |
|---|---|---|---|
| 5,673,092 A | 9/1997 | Horie et al. | |
| 5,872,611 A | 2/1999 | Hirata et al. | |
| 6,040,885 A | * 3/2000 | Koike et al. | 349/129 |
| 6,188,457 B1 | * 2/2001 | Liu | 349/156 |
| 6,256,080 B1 | * 7/2001 | Colgan et al. | 349/129 |
| 6,335,780 B1 | * 1/2002 | Kurihara et al. | 349/156 |

FOREIGN PATENT DOCUMENTS

| CN | 1127363 | 7/1996 |
|---|---|---|
| DE | 694 13 624 | 5/1999 |
| EP | 0 636 917 | 2/1995 |
| JP | 06-043461 | 2/1994 |
| JP | 07-013164 | 1/1995 |
| JP | 07-043719 | 2/1995 |
| JP | 08-292423 | 11/1996 |
| JP | 10-301112 | 11/1998 |
| JP | 11-258606 | 9/1999 |
| JP | 11-352489 | 12/1999 |
| JP | 2000-098387 | 4/2000 |
| JP | 2000-098387 | * 7/2000 |

* cited by examiner

Primary Examiner—Toan Ton
Assistant Examiner—Mike Qi
(74) Attorney, Agent, or Firm—Greer, Burns & Crain, Ltd.

(57) ABSTRACT

A first electrode and a second electrode for defining pixels are formed on the opposed surfaces of a first substrate and a second substrate, respectively. A first projecting pattern is formed on the surface of the first electrode. A domain boundary control means is formed on the opposite surface of the second substrate. The first electrode and the first projecting pattern are covered by a first alignment film. The second electrode and the domain boundary control means are covered by a second alignment film. The first and second alignment films differ from each other in at least one of such characteristics as the film thickness, material and surface activity. After an ac voltage has been applied between the first and second electrodes, a dc voltage remaining between the first and second alignment films is lower than a dc voltage that would remain if such characteristics were equal.

13 Claims, 11 Drawing Sheets

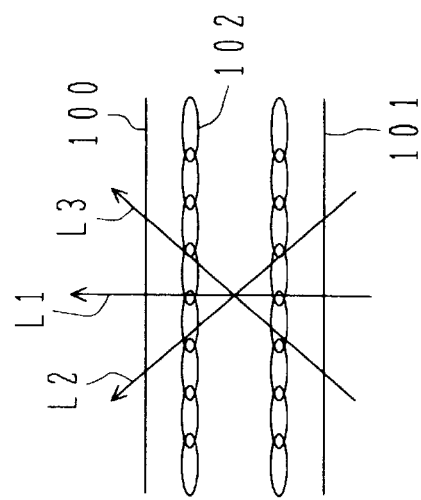
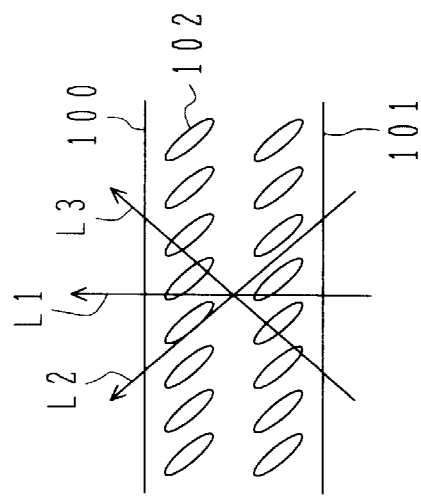
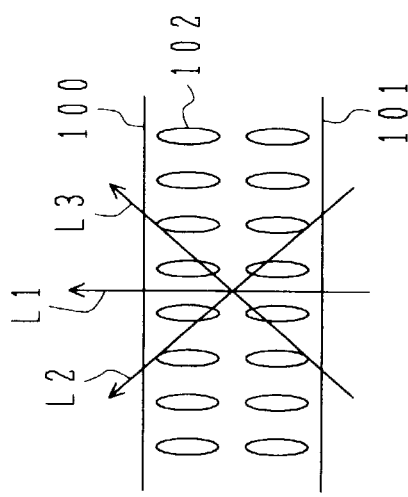

LIQUID CRYSTAL DISPLAY DEVICE AND ITS MANUFACTURE METHOD IN WHICH THE ALIGNMENT FILMS HAVING DIFFERENT CHARACTERISTICS

This is a continuation of Inernational Application No. PCT/JP00/00449, filed Apr. 24, 2000.

TECHNICAL FIELD

The present invention relates to a liquid crystal display device and more particularly to a liquid crystal display device wherein liquid crystal molecules are aligned vertically (homeotropically) between two substrates when an electric field is not applied and each pixel is divided into a plurality of domains.

BACKGROUND ART

FIGS. 9A to 9C are cross sectional views showing a black display state, a half tone display state and a white display state, respectively, of a conventional liquid crystal display of a homeotropic alignment type. Liquid crystal material which contains liquid crystal molecules 102 having a negative dielectric constant anisotropy is filled in a space between a pair of substrates 100 and 101. A polarizer is disposed on the outer surfaces of the substrates 100 and 101, with their polarization axes being crossed at a right angle.

As shown in FIG. 9A, when a voltage is not applied, liquid crystal molecules 102 are disposed vertically to the substrates 100 and 101 to form a black display. As a voltage is applied across the substrates, the liquid crystal molecules 102 are disposed in parallel to the substrates as shown in FIG. 9C. In this case, the polarization direction of light passing through the liquid crystal layer rotates to form a white display.

As shown in FIG. 9B, as a voltage lower than the voltage for the white display state is applied, the liquid crystal molecules 102 are disposed obliquely to the substrates. Light L1 propagating in a direction perpendicular to the substrates forms a half tone color. For light L2 propagating from the lower right to upper left as viewed in FIG. 9B, the liquid crystal layer hardly exhibits the birefringence effects. Therefore, when the display screen is viewed from the upper left, it develops black. Conversely, for light L3 propagating from the lower left to upper right in FIG. 9B, the liquid crystal layer exhibits greatly the birefringence effects. Therefore, when the display screen is viewed from the upper right, it develops color near white. As above, a usual homeotropic type liquid crystal display device has poor view angle characteristics of the half tone display state.

In order to improve the view angle characteristics, a multi domain type has been proposed to divide one pixel into a plurality of domains. In a multi domain type liquid crystal display device, an inclination direction of liquid crystal molecules is aligned in one direction in each domain and is different between domains, respectively in the half tone display state. With reference to FIG. 10, examples of the structure and operation principle of a liquid crystal display device of a multi domain type homeotropic orientation (multi domain vertical alignment type (MVA type)) will be described.

FIG. 10 is a cross sectional view of a MVA type liquid crystal display device. First protrusion patterns 17 are formed on the inner surface of a glass substrate 1, and second protrusion patterns 18 are formed on the inner surface of an opposing substrate 36. The first and second protrusion patterns 17 and 18 are alternately disposed. Vertical alignment films 28 covering the protrusion patterns 17 and 18 are formed on the inner surfaces of the glass substrate 1 with TFT's and the opposing substrate 36.

Liquid crystal material 29 which contains liquid crystal molecules 30 is filled in a space between the glass substrate 1 with TFT's and the opposing substrate 36. The liquid crystal molecule 30 has a negative dielectric constant anisotropy. The dielectric constant of the protrusion patterns 17 and 18 is lower than that of the liquid crystal material 29. On the outer surfaces of the glass substrate 1 and opposing substrate 36, polarizer 31 and 32 are cross-Nicol disposed. When no voltage is applied, the liquid crystal molecules 30 are aligned vertically to the substrate surfaces so that a good black display state can be obtained.

As a voltage is applied across the substrates, equipotential planes indicated by broken lines 16 are obtained. Specifically, since the dielectric constant of the projection patterns 17 and 18 is lower than that of the liquid crystal layer, an equipotential plane 16 near the side walls of the projection patterns 17 and 18 inclines to be lower in the projection pattern. Therefore, liquid crystal molecules 30$a$ near the sidewalls of the projection patterns 17 and 18 incline so as to be in parallel to the equipotential plane 16. Liquid crystal molecules 30 near the molecules 30$a$ are influenced by the inclination of the liquid crystal molecules 30$a$ and incline in the same direction. Therefore, the liquid crystal molecules 30 between the first and second protrusion patterns 17 and 18 are aligned with their longitudinal axes (directors) being slanted upward right. Liquid crystal molecules 30 on the left side of the first projection pattern 17 and liquid crystal molecules 30 on the right side of the second projection pattern 18 are aligned with their directors being slanted downward right.

A plurality of domains having different inclination directions of liquid crystal molecules from each other are therefore defined in one pixel. The first and second protrusion patterns 17 and 18 define the boundaries of domains. If the first and second projection patterns 17 and 18 are disposed parallel to each other, two types of domains can be formed. If the projection patterns are bent by 90°, four types of domains can be formed. As a plurality of domains are formed in one pixel, the view angle characteristics of the halftone display state can be improved.

The present inventors have found that flickers become conspicuous when a specific display state is executed for an MVA type liquid crystal display device.

DISCLOSURE OF THE INVENTION

It is an object of the present invention to provide an MVA type liquid crystal display device capable of suppressing the generation of flickers.

It is another object of the present invention to provide a method of manufacturing an MVA type liquid crystal display device capable of suppressing the generation of flickers.

According to one aspect of the present invention, there is provided a liquid crystal display device, comprising: first and second substrates disposed in parallel and facing each other at some distance; liquid crystal material with liquid crystal molecules having a negative dielectric constant anisotropy and filled in a space between the first and second substrates; first and second electrodes respectively formed on inner surfaces of the first and second substrates and defining pixels; a first projection pattern formed on a surface of the first electrode; a domain boundary regulating member formed on the inner surface of the second substrate, the domain boundary regulating member together with the first projection pattern regulating the boundary of each domain in which the liquid crystal molecules are tilted in a same direction; a first alignment film formed on the inner surface of the second substrate, covering the first electrode and the first projection pattern, the first alignment film vertically directing the liquid crystal molecules in the liquid crystal material; and a second alignment film formed on the inner surface of the second substrate, covering the second electrode and the domain boundary regulating member, the second alignment film vertically directing the liquid crystal molecules in the liquid crystal material, wherein at least characteristics of ones of film thicknesses, materials and surface activation degrees of the first and second alignment films are different from each other, the different characteristics are set so that a residual d.c. voltage between the first and second alignment films after an a.c. voltage is applied across the first and second electrodes becomes smaller than a residual d.c. voltage when the characteristics are a same.

The generation of flickers and burning can be suppressed by lowering a residual d.c. voltage between two alignment films.

BRIEF DESCRIPTION OF THE DRAWINGS

FIGS. 9A to 9C are cross sectional views of liquid crystal cells illustrating the display principles of a black display state, a half tone display state and a white display state, respectively, of a conventional liquid crystal display device of a homeotropic alignment type.

BEST MODES FOR EMBODYING THE INVENTION

Prior to describing the embodiments of the invention, the cause of the generation of flickers in a conventional MVA type liquid crystal display will be studied.

Figure 1:
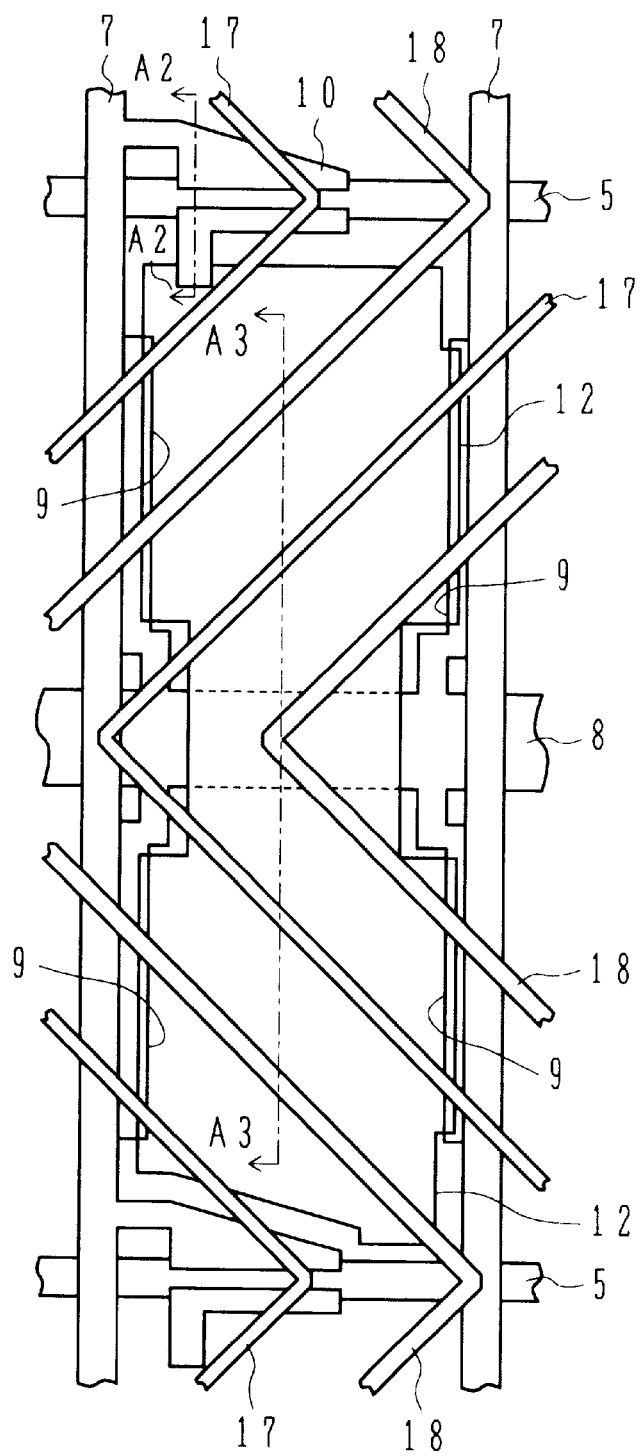
FIG. 1 is a plan view of an MVA type liquid crystal display device.

FIG. 1 is a plan view of a MVA type liquid crystal display device. A plurality of gate bus lines 5 extend in the row direction (horizontal direction in FIG. 1). Between two adjacent gate bus lines 5, a capacitance bus line 8 is disposed extending in the row direction. An insulating film covers the gate bus line 5 and capacitance bus line 8. On this insulating film, a plurality of drain bus lines 7 extending in the column direction (vertical direction in FIG. 1) are disposed.

A thin film transistor (TFT) 10 is formed in an area corresponding to a point at which the gate bus line 5 and drain bus line 7 intersect with each other. The drain region of TFT 10 is connected to a corresponding drain bus line 7. The gate bus line 5 functions also as the gate electrode of a corresponding TFT 10.

An interlevel insulating film covers the drain bus line 7 and TFT 10. A pixel electrode 12 is disposed in an area surrounded by two gate bus lines 5 and two drain bus lines 7. The pixel electrode 12 is connected to the source region of a corresponding TFT 10.

Auxiliary capacitance branch lines 9 branched from the capacitance bus line 8 extend along the sides of the pixel electrode 12. The capacitance bus line 8 and auxiliary capacitance branch lines 9 serve as an electrode of an auxiliary capacitance, and the pixel electrode 12 serves as the other electrode of the auxiliary capacitance. A potential of the capacitance bus line 8 is fixed to an arbitrary potential.

As the potential of the drain bus line 7 changes, the potential of the pixel electrode 12 changes through capacitive coupling caused by parasitic capacitance. In the structure shown in FIG. 1, the pixel electrode 12 is coupled to the capacitance bus line 8 via the auxiliary capacitance, so that the potential change in the pixel electrode 12 can be decreased.

On the inner surfaces of a TFT substrate and an opposing substrate, TFT side protrusion patterns 17 and CF side protrusion patterns 18 are formed extending in the column direction in a zigzag pattern. The TFT side projection patterns 17 are disposed at the same pitch in the row direction, and their bending points are positioned above the gate bus line 5 and capacitance bus line 8. The CF side protrusion patterns 18 have patterns generally congruent to those of the TFT side protrusion patterns 17, and disposed generally at the center between two adjacent TFT side protrusion patterns 17.

The width of the TFT side protrusion pattern 17 is about 5 $\mu$m and the width of the CF side protrusion pattern 18 is about 10 $\mu$m.

A polarizer is disposed on opposite sides of the liquid crystal cell.

The polarizers are cross-Nicol disposed so that the polarization axes cross the straight line portion of the projection patterns 17 and 18 at 45°.

Figure 2:
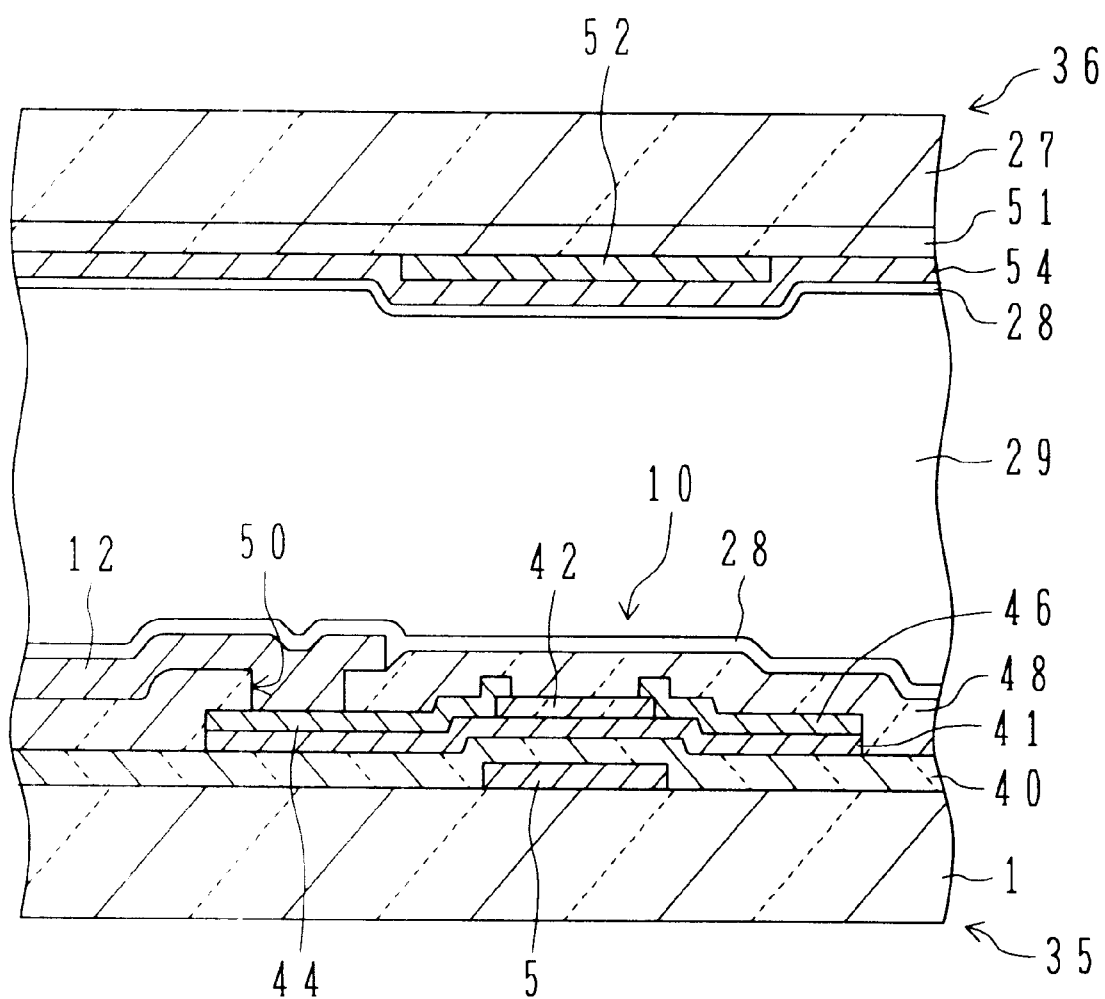
FIG. 2 is a cross sectional view of a TFT area of the MVA type liquid crystal display device.
Figure 3:
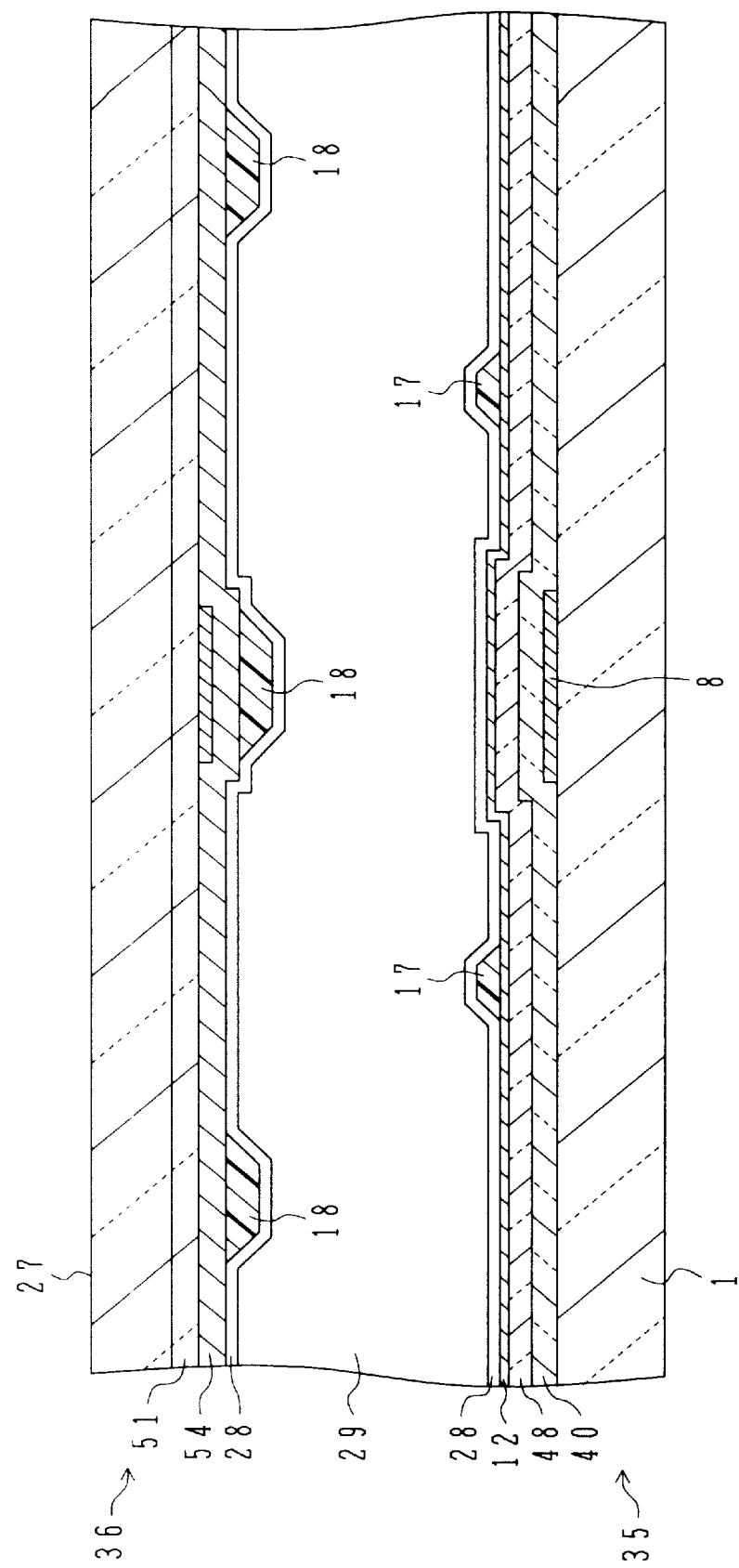
FIG. 3 is a cross sectional view of a pixel electrode area of the MVA type liquid crystal display device.

FIG. 2 is a cross sectional view showing a TFT area and taken along one-dot chain line A2—A2 shown in FIG. 1, and FIG. 3 is a cross sectional view showing a pixel electrode area and taken along one-dot chain line A3—A3 shown in FIG. 1. The TFT substrate 35 and opposing substrate 36 are disposed in parallel at some distance. Liquid crystal material 29 is filled in a space between the TFT substrate 35 and opposing substrate 36. The liquid crystal material 29 has a negative dielectric constant anisotropy.

As shown in FIG. 2, on the inner surface of a glass substrate 1, the gate bus line 5 is formed. The gate bus line 5 is formed by depositing an Al film to a thickness of 100 nm and a Ti film to a thickness of 50 nm by sputtering and thereafter pattering these two films. Etching the Al film and Ti film is performed by reactive ion etching using mixed gas of $BCl_3$ and $Cl_2$.

A gate insulating film 40 is formed on the glass substrate 1, covering the gate bus line 5. The gate insulating film 40 is made of an SiN film having a thickness of 400 nm formed by plasma enhanced chemical vapor deposition (PE-CVD).

On the surface of the gate insulating film 40, an active region 41 is disposed overriding the gate bus line 5. The active region 41 is made of a non-doped amorphous Si film having a thickness of 30 nm formed through PE-CVD. A channel protection film 42 covers the surface of the active region 41 in an area above the gate bus line 5. The channel protection film 42 is made of an SiN film having a thickness of 140 nm. The channel protection film 42 is patterned so that it covers the channel region of TFT 10 shown in FIG. 1.

The channel protection film 42 is formed by the following method.

First, the surface of the SiN film formed on the whole substrate surface is covered with a photoresist film. By using the gate bus line 5 as a photomask, the photoresist film is exposed from the back of the glass substrate 1 to define the side of the resist pattern parallel to the row direction in FIG. 1. The side parallel to the column direction in FIG. 1 can be defined through light exposure using a usual photomask.

After the photoresist film is developed, the SiN film is etched and patterned by using etchant based on buffered hydrofluoric acid. The SiN film may be patterned through RIE using gas based on hydro fluoride. After the SiN film is patterned, the resist pattern is removed. With the above processes, the channel protection film 42 can be formed.

A source electrode 44 and a drain electrode 46 are formed on the upper surface of the active region 41 in areas on both sides of the channel protection film 42. The source electrode 44 and drain electrode 46 each have the lamination structure of an $n^+$-type amorphous Si film of 30 nm in thickness, a Ti film of 20 nm in thickness, an Al film of 75 nm in thickness, and a Ti film of 80 nm in thickness stacked in this order. TFT 10 is constituted of the gate bus line gate insulating film 40, active region 41, source electrode 44 and drain electrode 46.

The active region 41, source electrode 44 and drain electrode 46 are patterned by using one etching mask. These are etched by RIE using mixed gas of $BCl_3$ and $Cl_2$. In this case, the channel protection film 42 serves as an etching stopper layer in an area above the gate bus line 5.

The pixel electrode 12 is formed on a protective insulating film 48. The pixel electrode 12 is made of an indium tin oxide (ITO) film having a thickness of 70 nm, and is connected to the source electrode 44 via a contact hole 50 formed through the protective insulating film 48. The ITO film is formed by DC magnetron sputtering. The ITO film is patterned by wet etching using etchant based on oxalic acid. An alignment film 28 covers the pixel electrode 12 and protective insulating film 48.

Next, the structure of the opposing substrate 36 will be described. In the inner surface of a glass substrate 27, a color filter 51 is formed. A light shielding film 52 of Cr or the like is formed on the surface of the color filter 51 in an area opposing TFT 10. A common electrode 54 of ITO is formed on the surface of the color filer 51, covering the light shielding film 52. An alignment film 28 covers the surface of the common electrode 54.

The pixel electrode area shown in FIG. 3 will be described. On the surface of the glass substrate 1, the capacitance bus line 8 is formed. The capacitance bus line 8 is formed by the same process as the process of forming the gate bus line 5 shown in FIG. 2. The gate insulating film 40 and protective insulating film 48 are formed on the surface of the glass substrate 1 to cover the capacitance bus line 8. The pixel electrode 12 is formed on the surface of the protective insulating film 48.

The TFT side protrusion pattern 17 is formed on the surface of the pixel electrode 12. The TFT side protrusion pattern 17 is formed by coating photoresist based on polyimide and pattering this resist film as shown in FIG. 1.

The alignment film 28 covers the surfaces of the TFT side projection pattern 17 and pixel electrode 12.

The color filter 51 is formed on the inner surface of the glass substrate 27 opposing the TFT substrate 35. The light shielding film 52 is formed on a partial surface of the color filter 51. The common electrode 54 is formed on the surface of the color filter 51, covering the light shielding film 52. The CF side projection pattern 18 is formed on the surface of the common electrode 54.

The CF side projection pattern 18 is formed by a similar method to the method of forming the TFT side projection pattern 17. However, various patterns formed on the surface of the opposing substrate 27 are not required to be so fine as those formed on the surface of the TFT substrate 35. From this reason, the CF side projection pattern 18 is generally formed broader than the TFT side projection pattern 17 in terms of manufacture requirements. For example, the width of the TFT side projection pattern 17 is 5 $\mu$m and the width of the CF side projection pattern 18 is 10 $\mu$m. The alignment film 28 covers the surfaces of the CF side projection pattern 18 and common electrode 54.

In displaying an image, a constant common voltage is applied to the common electrode 54, and an image signal whose polarity is reversed for each frame is applied to the pixel electrode 12. If the voltage applied to the liquid crystal layer when the pixel electrode 12 takes a positive polarity relative to the common electrode 54 is equal to the voltage when it takes a negative polarity, the transmittance when the pixel electrode 12 takes the positive polarity becomes equal to that when it takes the negative polarity, resulting in a stable display.

Figure 4A:
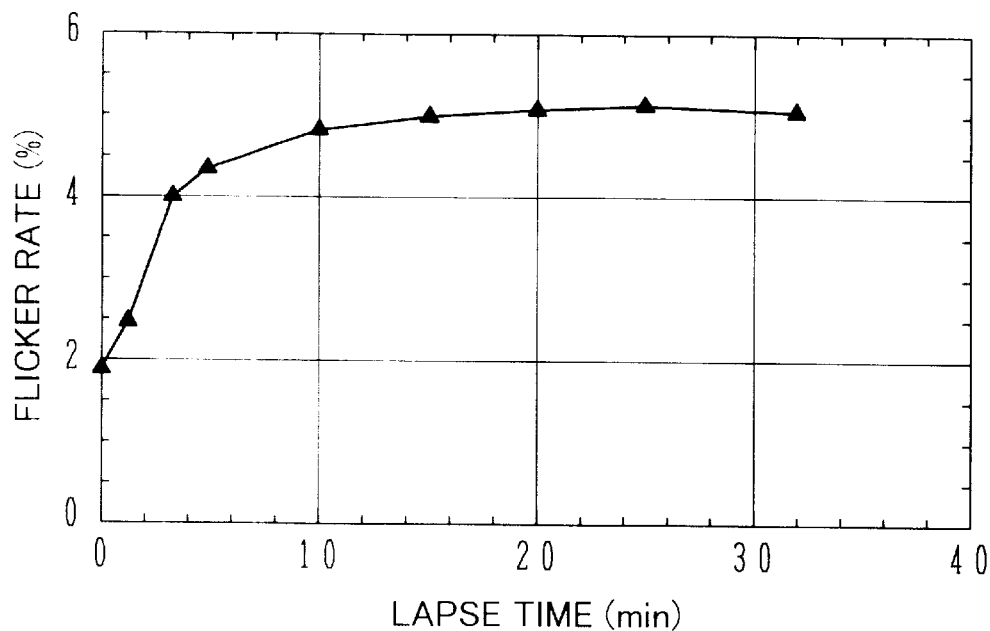
FIG. 4A is a graph showing a change in a flicker rate with time of a conventional MVA type liquid crystal display device.

FIG. 4A shows a change in a flicker rate with time of the MVA type liquid crystal display device shown in FIGS. 1 to 3. The abscissa represents a lapse time in the unit of "minute" from when the common voltage is set so that the flicker rate becomes minimum, and the ordinate represents the flicker rate in the unit of "%". It is seen that the flicker rate increases as the time lapses.

Figure 4B:
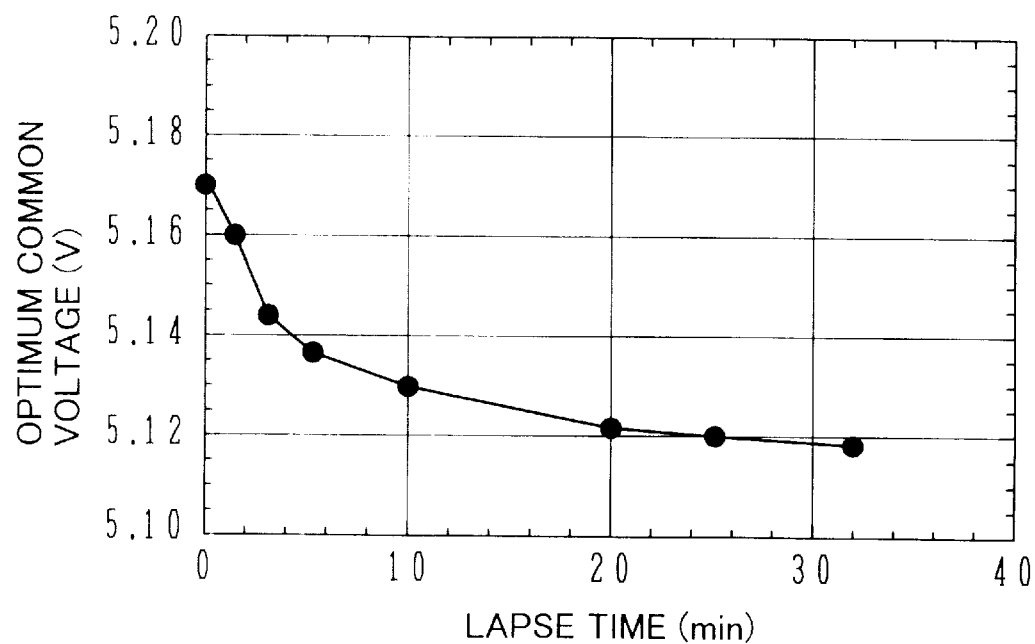
FIG. 4B is a graph showing a change in an optimum common voltage with time.

FIG. 4B shows a change in an optimum common voltage with time, the optimum common voltage making the flicker rate minimum. It is seen that the optimum common voltage lowers as the time lapses. This may be ascribed to that charges are accumulated on the surface of the alignment film 28 or the like as the time lapses. If the accumulated charge amount on the TFT substrate 35 side is different from that on the opposing substrate 36 side, a d.c. voltage corresponding to a difference between the accumulated charge amounts is applied across the liquid crystal layer. This d.c. voltage is called a residual d.c. voltage because this voltage maintains residually even if the external application voltage is set to 0 V.

The optimum common voltage is set while the residual d.c. voltage is not generated. If the residual d.c. voltage is generated, the absolute value of the voltage generated across the liquid crystal layer when the pixel electrode 12 takes a positive polarity relative to the common electrode 54 does not become equal to that when it takes a negative polarity. A difference between the absolute values of the voltages causes flickers. As shown in FIG. 4B, as the time lapses, the optimum common voltage lowers from about 5.17 V to 5.12 V. It can be considered that this lowered amount of 0.05 V corresponds to the residual d.c. voltage.

The present inventors consider that one of the causes of generating the residual d.c. voltage is a geometrical shape difference of the cross section between the TFT side projection pattern 17 and CF side projection pattern 18. Evaluation experiments made for clarifying the relation between the projection pattern shape and flickers will be described.

Figure 5A:
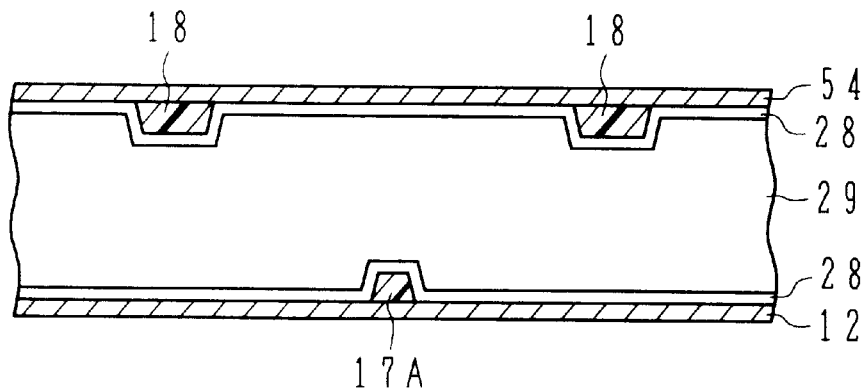
FIGS. 5A to 5C are cross sectional views of MVA type liquid crystal display devices used for evaluation experiments.
Figure 5B:
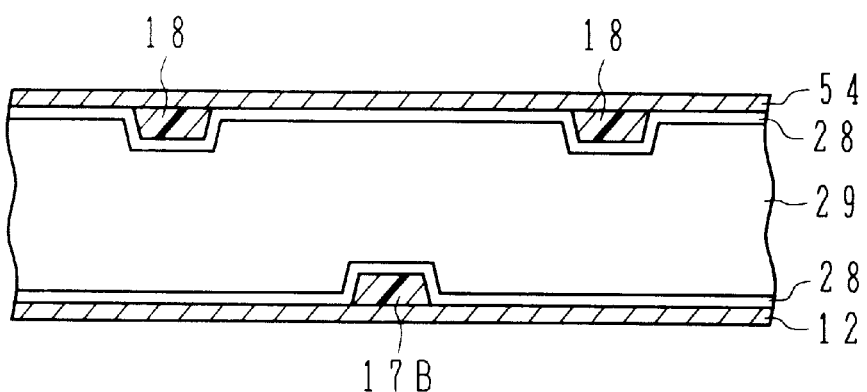
Figure 5C:
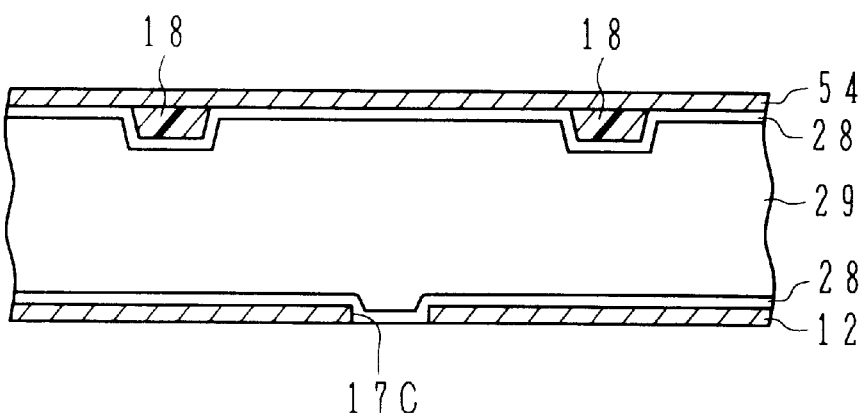

FIGS. 5A to 5C are schematic cross sectional diagrams of liquid crystal display devices manufactured for evaluation experiments. In any one of FIGS. 5A to 5C, the width of the CF side projection pattern 18 was set to 10 μm. In the samples shown in FIGS. 5A and 5B, the widths of TFT side projection patterns 17A and 17B were set to 5 μm and 10 μm, respectively. In the sample shown in FIG. 5C, in place of the TFT side projection pattern, a slit having a width of 10 μm was formed in the pixel electrode 12. The slit formed in the pixel electrode can regulate the position of the boundaries of domains, similar to the projection pattern. In the following, the projection pattern and slit are collectively called a domain boundary regulating member.

Figure 6A:
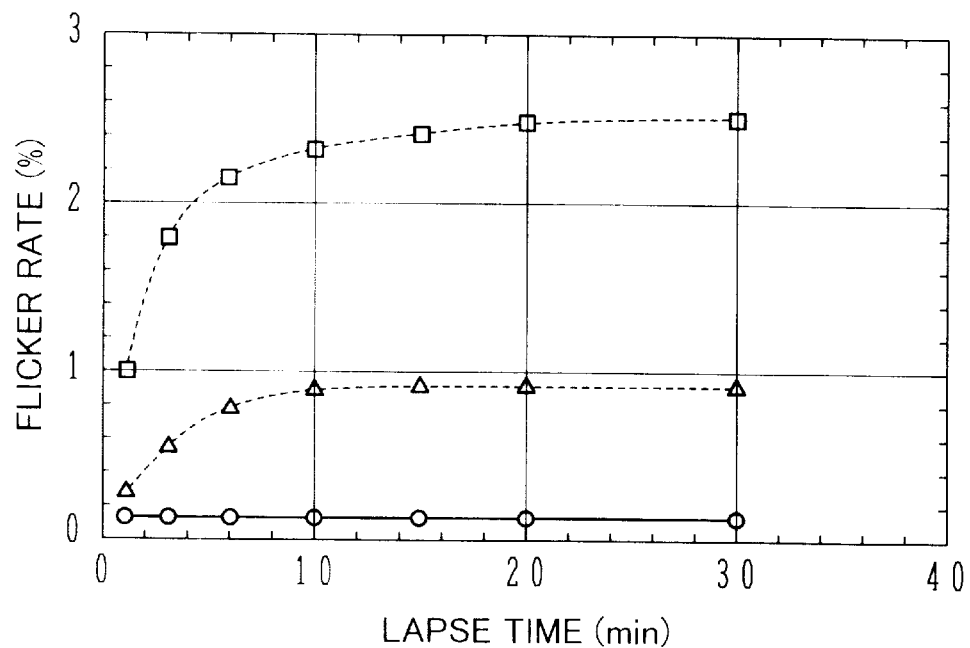
FIG. 6A is a graph showing a change in a flicker rate with time of the MVA type liquid crystal display devices used for evaluation experiments.
Figure 6B:
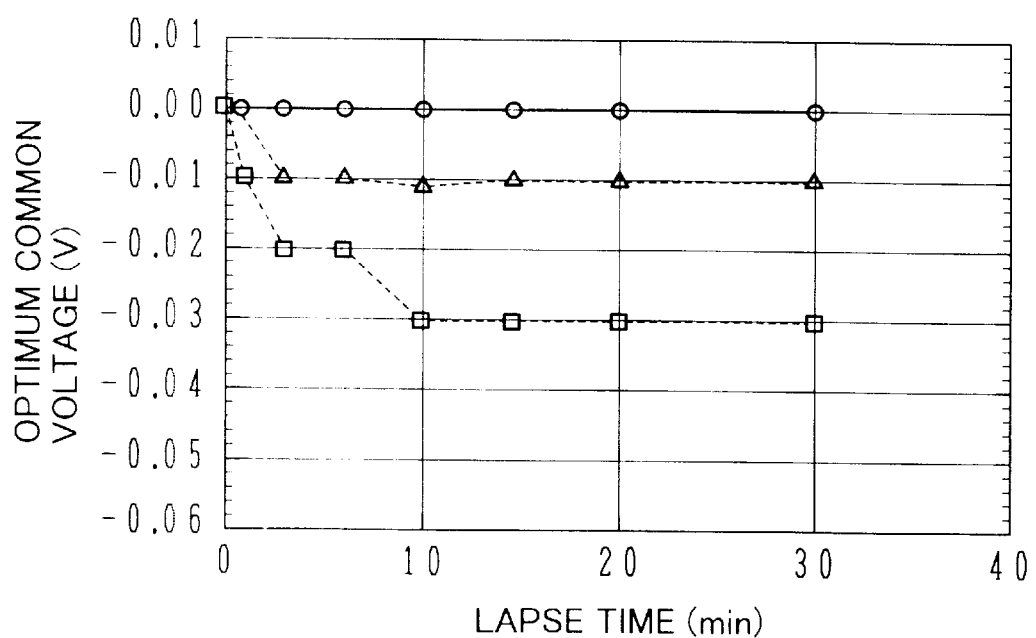
FIG. 6B is a graph showing a change in an optimum common voltage with time.

FIG. 6A shows a change in the flicker rate with time of each sample. FIG. 6B shows a change in the optimum common voltage with time. In FIGS. 6A and 6B, triangle symbols, circle symbols and square symbols correspond to the samples shown in FIGS. 5A, 5B and 5C, respectively. As in the case of the sample shown in FIG. 5B, if the same geometrical shape is used for the TFT side projection pattern 17 and CF side projection pattern 18, the flicker rate and optimum common voltage are stable. In contrast, as in the case that the two projection patterns have different widths or that one of the domain boundary regulating member is a projection pattern and the other is a slit, if the geometrical shape of the cross section of the domain boundary regulating member is different between the TFT substrate and opposing substrate, the flicker rate increases and the optimum common voltage lowers, as the time lapses.

From this, it can be considered that the cause of generating the residual d.c. voltage is a different geometrical shape of the cross section of the domain boundary regulating member between the TFT substrate side and opposing substrate side.

Next, embodiments will be described which can suppress the generation of a residual d.c. voltage even if the geometrical shape of the cross section of the domain boundary regulating member is different between the TFT substrate side and opposing substrate side. The cross sectional views of the liquid crystal display devices of the embodiments shown in FIGS. 7A to 7E are drawn by paying attention to the domain boundary regulating member and alignment films. Other constituent elements are similar to those of the MVA type liquid crystal display device shown in FIGS. 1 to 3, so that the details are not drawn and the description thereof is omitted.

Figure 7A:
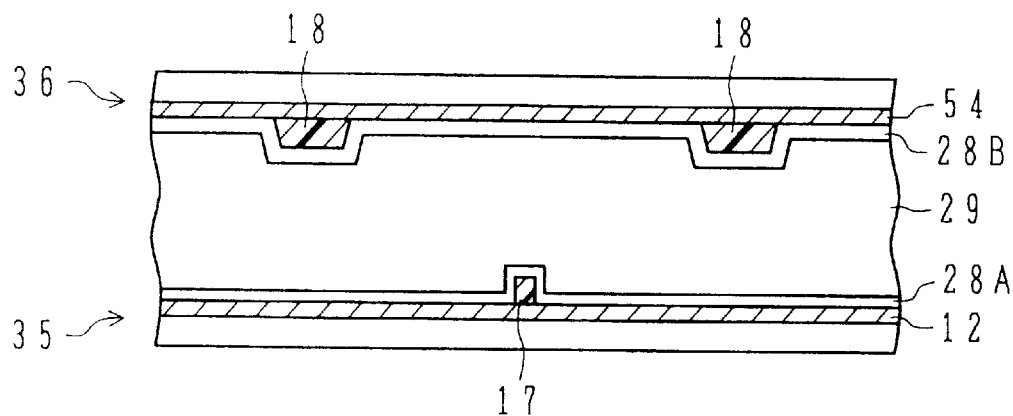
FIGS. 7A to 7E are schematic cross sectional views showing liquid crystal display devices according to first to fifth embodiments, respectively.

FIG. 7A is a schematic cross sectional view of a liquid crystal display device according to a first embodiment. The width of a TFT side projection pattern 17 is 5 μm and the width of a CF side projection pattern 18 is 10 μm. A method of forming these projection patterns 17 and 18 will be described.

Resist LC-200 manufactured by Shipley Company is spin-coated on the surface of a substrate, and then it is pre-baked for 30 minutes at 90° C. Light is exposed at an exposure light intensity of 10 mW/cm² and an exposure time of 5 seconds and then development is performed. Post-baking is performed for 35 minutes at 120° C. and for 60 minutes at 200° C. The height of the projection patterns 17 and 18 was set to about 1.3 μm.

An alignment film 28B on the opposing substrate 36 side is thinner than that of an alignment film 28A on the TFT substrate 35 side. A method of forming the alignment films 28A and 28B will be described.

A soluble polyimide alignment film JALS-657R3 manufactured by JSR Microelectronics is spin-coated on the substrate surface. The alignment film 28B on the opposing substrate 36 is formed at the number of revolutions of 3000 μm in 20 seconds, and the alignment film 28A on the TFT substrate 35 is formed at the number of revolutions of 1500 rpm in 20 seconds. Thereafter, precure is performed for 40 seconds at 80° C. and post-baking is performed for 60 minutes at 180° C. The thicknesses of the alignment films 28A and 28B were 55 nm and 92 nm, respectively.

Liquid crystal material MJ961213 manufactured by MERCK Japan Ltd. was used as liquid crystal material 29, and SP-2035 manufactured by SEKISUI CHEMICAL CO., LTD. was used as a spacer.

A triangular voltage was applied across the common electrode 54 and pixel electrode 12 and the charge conveyance amount to be caused by ions in the liquid layer was measured. The instrument used was an ion density measuring instrument MTR-1 manufactured by TOYO Corporation, the peak value of the triangular voltage was 10 V and its frequency was 0.1 Hz. The temperature of the liquid crystal display device under measurement was set to 50° C. The charge conveyance amounts at the positive voltage applied to the pixel electrode 12 and at the negative voltage applied to the pixel electrode 12 were both 40 pC/cm². When the thicknesses of the alignment films 28A and 28B were both set to 55 nm, the charge conveyance amount at the positive voltage applied to the pixel electrode 12 was 42 pC/cm² and the charge conveyance amount at the negative voltage applied to the pixel electrode 12 was 31 pC/cm².

If the charge conveyance amount at the positive voltage applied to the pixel electrode 12 is different from that at the negative voltage applied to the pixel electrode 12, there is a deviation of charges in the liquid crystal layer in the thickness direction so that the residual d.c. voltage is likely to be generated. In the first embodiment, since the charge conveyance amount at the positive voltage is generally equal to the charge conveyance amount at the negative voltage, a deviation of charges is not likely to be generated and the generation of the residual d.c. voltage can be suppressed.

In the first embodiment, a deviation of charges to be caused by different widths of the projection patterns is cancelled by different thicknesses of the alignment films. In the first embodiment, the alignment film formed on the substrate having a narrower projection pattern is made thinner. More in general, the thicknesses of both the alignment films are made different so that a residual d.c. voltage between the two alignment films 28A and 28B after an a.c. voltage is applied for some time between the common electrode and pixel electrode becomes smaller than a residual d.c. voltage when the alignment films having the same thickness are used. In this manner, the generation of flickers can be suppressed. By reducing a deviation of charges, the burning phenomenon becomes difficult to occur.

It is preferable that a difference between the thicknesses of the alignment films is set greater than a difference made by usual manufacture processes, generally, about 10% of a film thickness.

According to the experiments by the present inventors, it has been found that charges are not likely to be accumulated for the substrates using slits as the domain boundary regulating member than for the substrates using projection patterns. It is expected from this that a deviation of charges can be reduced by making the alignment film for the substrate using slits as the domain boundary regulating member thicker than the other alignment film.

Figure 7B:
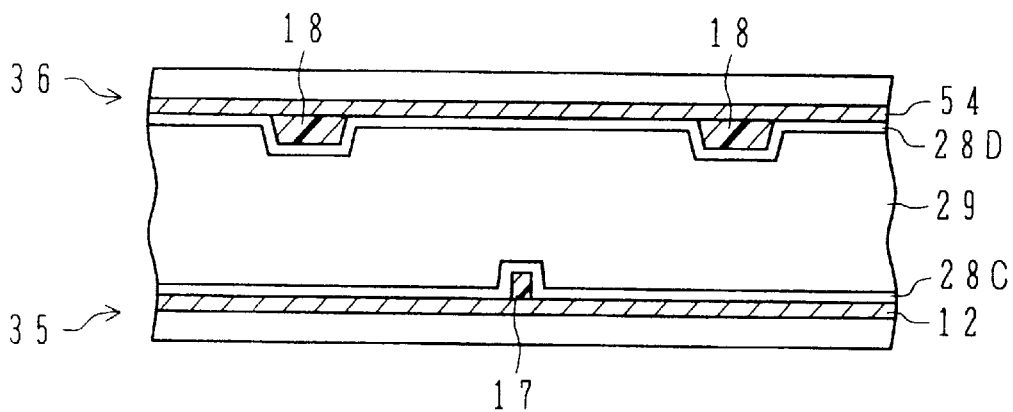

FIG. 7B is a cross sectional view showing a liquid crystal display device according to a second embodiment. In the first embodiment, a deviation of charges is reduced by using the alignment films having different thicknesses. In the second embodiment, different baking temperatures for alignment films are used to reduce a deviation of charges. The alignment film material used is the same as the first embodiment.

An alignment film 28C on the TFT substrate 35 and an alignment film 28D on the opposing substrate 36 were both coated at the number of revolutions of 1500 µm in 20 seconds. Post-baking for the alignment film 28C was performed for 60 minutes at a temperature of 150° C., and post-baking for the alignment film 28D was performed for 60 minutes at a temperature of 180° C. The charge conveyance amount to be caused by ions of the liquid crystal display device manufactured as above was measured. The charge conveyance amounts at the positive voltage applied to the pixel electrode 12 and at the negative voltage applied to the pixel electrode 12 were both 41 $pC/cm^2$.

When the post-baking temperature of 180° C. was used for both the alignment films 28C and 28D, the charge conveyance amount at the positive voltage applied to the pixel electrode 12 was 42 $pC/cm^2$ and the charge conveyance amount at the negative voltage applied to the pixel electrode 12 was 31 $pC/cm^2$.

It can be considered that an imide rate lowers if the post-baking temperature for the alignment film is lowered. Namely, in the second embodiment, the deviation of charges is reduced by using different imide rates of two alignment films.

In order to reduce the deviation of charges, different materials may be used for two alignment films. For example, the alignment film 28C on the TFT substrate 35 is made of material based on soluble polyimide, and the alignment film 28D on the opposing substrate 36 is made of material based on polyamic acid. JALS-657R3 manufactured by JSR Microelectronics was used as the material based on soluble polyimide, and JALS-684 manufactured by JSR Microelectronics was used as the material based on polyamic acid. In this case, the charge conveyance amounts at the positive voltage applied to the pixel electrode 12 and at the negative voltage applied to the pixel electrode 12 were both 46 $pC/cm^2$.

One of the alignment films may be made of organic material and the other is made of inorganic material. The alignment film 28D on the opposing substrate 36 was made of inorganic alignment film material manufactured by NISSAN CHEMICAL INDUSTRIES, LTD., and the alignment film 28C on the TFT substrate 35 was made of organic alignment film material JALS-657R3 manufactured by JSR Microelectronics. In this case, the charge conveyance amounts to be caused by ions at the positive voltage applied to the pixel electrode 12 and at the negative voltage applied to the pixel electrode 12 were both 31 $pC/cm^2$.

Liquid crystal cells are manufactured by using combinations of alignment film materials and the charge conveyance amounts to be caused by ions are measured. In this manner, a combination of proper materials can be found.

A deviation of charges can be reduced by applying ultraviolet rays to one of the alignment films, not by using different alignment film materials. By using JALS-657R3 manufactured by JSR Microelectronics as the alignment film material, ultraviolet rays were applied to the surface of the alignment film on the TFT substrate. Ultraviolet rays having an illuminance of 10 $mW/cm^2$ at the wavelength of 365 nm were applied for 5 minutes. The alignment film forming conditions were the same as the conditions of forming the alignment film 28B on the opposing substrate 36 of the first embodiment.

The charge conveyance amount to be caused by ions at the positive voltage applied to the pixel electrode 12 of the liquid crystal display device was 45 $pC/cm^2$, and that at the negative voltage was 46 $pC/cm^2$. As above, the deviation of charges can be reduced by ultraviolet ray radiation. This happens because ultraviolet ray radiation changes the surface activation degree of the alignment film and as a result the degree of accumulating charges on the alignment film changes.

Figure 7C:
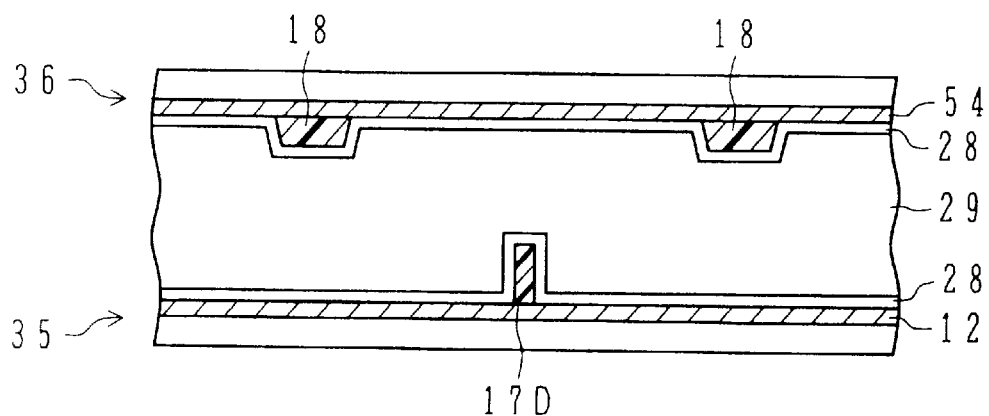

FIG. 7C is a schematic cross sectional view of a liquid crystal display device according to a third embodiment. In the first and second embodiments, the deviation of charges caused by a difference of the geometrical shape of the cross section between projection patterns, more particularly by a width difference, is canceled by using different thicknesses, materials, surface activation degrees or the like of the alignment films. In the third embodiment, different heights of projection patterns are used to cancel the deviation of charges.

According to the experiments by the inventors, it has been found that as the projection pattern is made higher, electrons are more likely to be accumulated on the surface of the alignment film covering the projection pattern. As shown in FIG. 7C, by making a projection pattern 17D having a narrower width higher than the other projection pattern 18, the deviation of charges can be reduced. For example, the height of the projection pattern having a width of 10 µm may be set to about 1.5 µm and the height of the projection pattern having a width of 5 µm is set to about 2 µm.

It is preferable that a difference between the heights of the alignment films is set greater than a difference made by usual manufacture processes, generally, about 10% of a projection pattern height.

Figure 7D:
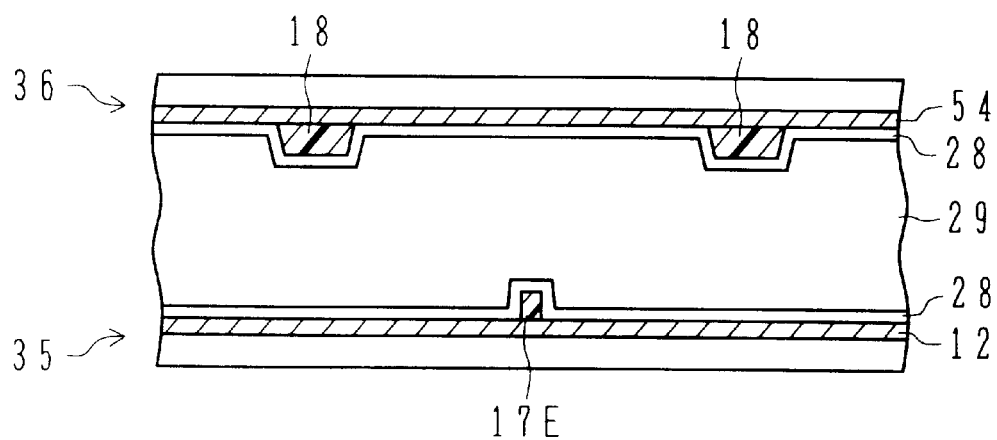

FIG. 7D is a schematic cross sectional view showing a liquid crystal display device according to a fourth embodiment. In the third embodiment, the deviation of charges is reduced by using different heights of the projection patterns. In the fourth embodiment, the deviation of charges is reduced by using different materials of the projection patterns.

As shown in FIG. 7D, a projection pattern 17E on the TFT substrate 35 is narrower then a projection pattern 18 on the opposing substrate 36. The projection pattern 17E is made of material having a lower dielectric constant and a higher resistance than the projection pattern 18. The projection pattern 17E made of material having a lower dielectric constant and a higher resistance exhibits a higher alignment regulating force for liquid crystal molecules than the projection pattern 18. Charges are likely to be accumulated on the nearby alignment film surface or the like.

The projection pattern 17E having the characteristics that charges are likely to be accumulated is made narrower than the projection pattern 18. Therefore, the accumulation degree of charges on the TFT substrate 35 side becomes equal to that on the opposing substrate 36. The deviation of charges can therefore be reduced.

Figure 7E:
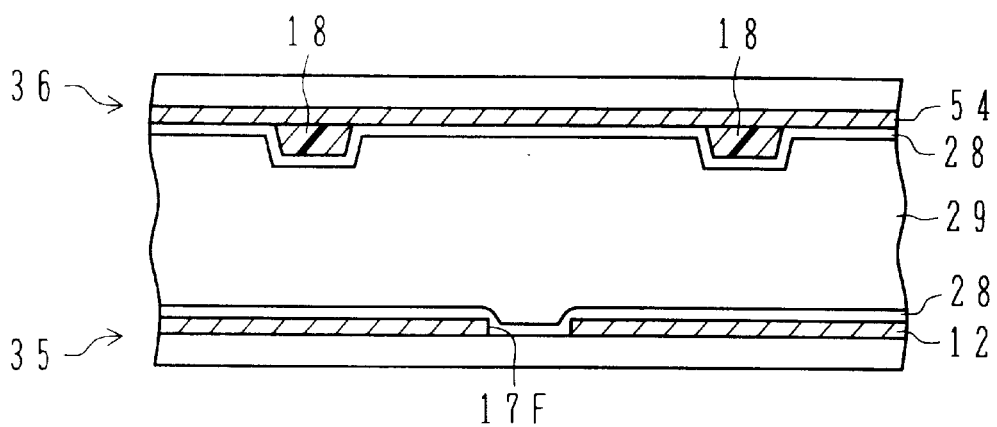

FIG. 7E is a schematic cross sectional view showing a liquid crystal display device according to a fifth embodiment. In the fifth embodiment, a slit 17F is formed in the pixel electrode 12 as the domain boundary regulating member on the TFT substrate 35. According to the experiments by the inventors, it has been found that as the width of the slit 17F is made equal to the width of the projection pattern 18 on the opposing substrate 36, charges are likely to be accumulated on the projection pattern 18. By making wider the slit 17F than the projection pattern 18, the deviation of charges can be reduced.

In the fourth and fifth embodiments, the deviation of charges is reduced by adjusting the width of the domain boundary regulating member such as the projection pattern and slit.

Figure 8A:
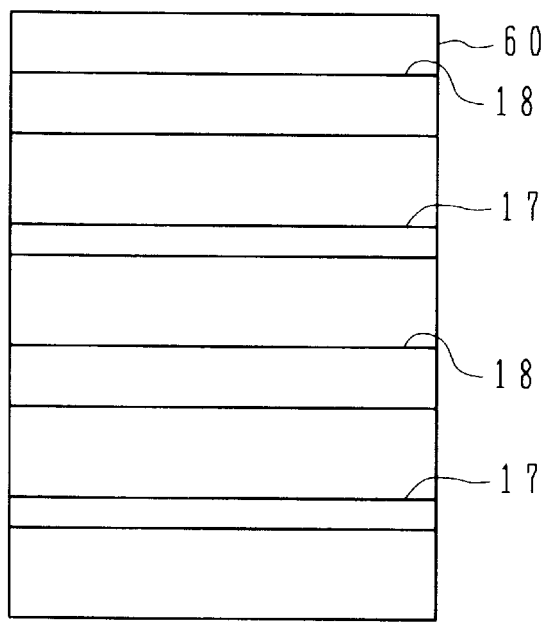
FIGS. 8A and 8B are plan views showing an example of the layout of domain boundary regulating member of the liquid crystal display devices of the fourth and fifth embodiments, respectively.

FIG. 8A is a schematic plan view of a liquid crystal display device having adjusted widths of domain boundary regulating member. Domain boundary regulating member 17 on the TFT substrate and domain boundary regulating member 18 on the opposing substrate pass through each pixel 60. By using different widths of the domain boundary regulating members 17 and 18, the deviation of charges can be reduced.

Figure 8B:
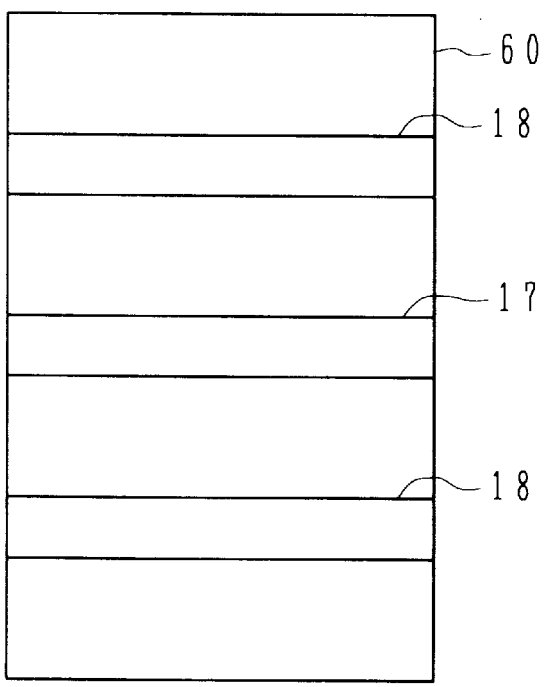
Figure 10:
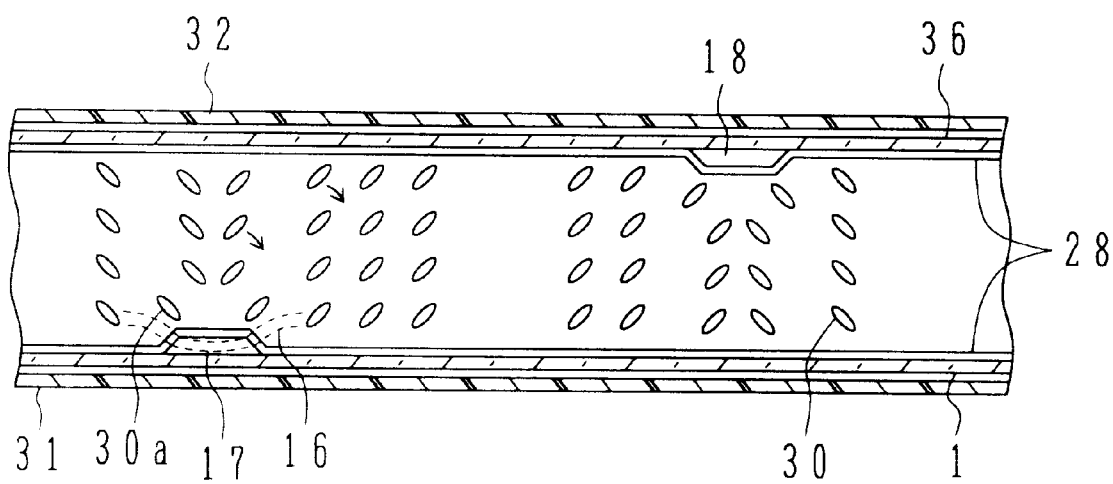
FIG. 10 is a cross sectional view of a liquid crystal cell illustrating a display principle of a MVA type liquid crystal display device.

As shown in FIG. 8B, although domain boundary regulating members 17 and 18 have the same width, they have different areas occupied in each pixel 60. Different areas are expected to provide the same effects as different widths. In this case, the length of the domain boundary regulating member 17 passing through the pixel 60 is different from that of the domain boundary regulating member 18.

As shown in FIG. 7C, if different heights of the projection patterns are used, the area occupied by the lower projection pattern is set broader than the area occupied by the higher projection pattern.

In the above-described embodiments, projections like ridges are formed on both substrates. Another structure for regulating the domain boundary may be formed on one of the substrates. For example, slits may be formed in the pixel electrode of the TFT substrate.

The present invention has been described in connection with the preferred embodiments. The invention is not limited only to the above embodiments. It is apparent that various modifications, improvements, combinations, and the like can be made by those skilled in the art.

What we claim are:

1. A liquid crystal display device, comprising:
    first and second substrates disposed in parallel and facing each other at some distance;
    liquid crystal material with liquid crystal molecules having a negative dielectric constant anisotropy and filled in a space between said first and second substrates;
    first and second electrodes respectively formed on inner surfaces of said first and second substrates and defining pixels;
    a first projection pattern formed on a surface of said first electrode;
    a domain boundary regulating member formed on the inner surface of said second substrate, said domain boundary regulating member together with said first projection pattern regulating the boundary of each domain in which the liquid crystal molecules are tilted in a same direction;
    a first alignment film formed on the inner surface of said first substrate, covering said first electrode and said first projection pattern, said first alignment film vertically directing the liquid crystal molecules in said liquid crystal material; and
    a second alignment film formed on the inner surface of said second substrate, covering said second electrode and said domain boundary regulating member, said second alignment film vertically directing the liquid crystal molecules in said liquid crystal material,
    wherein at least characteristics of at least one of film thicknesses, materials and surface activation degrees of said first and second alignment films are different from each other, and the different characteristics are set so that a residual d.c. voltage between said first and second alignment films after an a.c. voltage is applied across said first and second electrodes becomes smaller than a residual d.c. voltage when the characteristics are the same.

2. A liquid crystal display device according to claim 1, wherein:
    said domain boundary regulating member is a second projection pattern having a width narrower than a width of said first projection pattern or a slit formed in said second electrode; and
    said first alignment film is thinner than said second alignment film.

3. A liquid crystal display device according to claim 1, wherein:
    said domain boundary regulating member is a second projection pattern having a width narrower than a width of said first projection pattern or a slit formed in said second electrode; and
    said first and second alignment films are made of material based on polyimide, and an imide degree of said second alignment film is smaller than an imide degree of said first alignment film.

4. A liquid crystal display device according to claim 1, wherein:
    said domain boundary regulating member is a second projection pattern having a width narrower than a width of said first projection pattern or a slit formed in said second electrode; and
    said first alignment film is made of material based on polyimide and said second alignment film is made of material based on polyamic acid.

5. A liquid crystal display device according to claim 1, wherein:
    said domain boundary regulating member is a second projection pattern having a width narrower than a width of said first projection pattern or a slit formed in said second electrode; and
    said first alignment film is made of material based on polyimide and said second alignment film is made of inorganic material.

6. A method of manufacturing a liquid crystal display device, comprising the steps of:
    forming a first electrode on a principal surface of a first substrate;
    forming a first projection pattern on a surface of the first electrode;
    forming a first vertical alignment film covering the first electrode and the first projection pattern;
    forming a second electrode on a principal surface of a second substrate, the second electrode together with the first electrode defining a pixel when the second substrate and the first substrate are disposed facing each other;

forming a domain boundary regulating member on the principal surface of the second substrate, the domain boundary regulating member together with the first projection pattern regulating a boundary of each domain in which liquid crystal molecules tilt in a same direction, said liquid crystal molecules being filled in a space between the first and second substrate when the first and second substrates are disposed facing each other;

forming a second vertical alignment film covering the second electrode and the domain boundary regulating member;

applying an ultraviolet ray to one of the first and second alignment films, wherein, in said applying an ultraviolet ray step, the one alignment film to which the ultraviolet ray is applied is selected so that a deviation of charges accumulated on the first alignment film and the second alignment film is reduced;

disposing the first and second substrates having the principal surfaces spaced by some distance so that the principal surfaces face each other; and filling liquid crystal material having a negative dielectric constant anisotropy in a space between the first and second substrates.

7. A liquid crystal display device, comprising:

first and second substrates disposed in parallel and facing each other at some distance;

liquid crystal material with liquid crystal molecules having a negative dielectric constant anisotropy and filled in a space between said first and second substrates;

first and second electrodes respectively formed on inner surfaces of said first and second substrates and defining pixels;

a first projection pattern formed on a surface of said first electrode;

a domain boundary regulating member formed on the inner surface of said second substrate, said domain boundary regulating member together with said first projection pattern regulating the boundary of each domain in which the liquid crystal molecules tilt in a same direction;

a first alignment film formed on the inner surface of said first substrate, covering said first electrode and said first projection pattern, said first alignment film vertically directing the liquid crystal molecules in said liquid crystal material; and a second alignment film formed on the inner surface of said second substrate, covering said second electrode and said domain boundary regulating member, said second alignment film vertically directing the liquid crystal molecules in said liquid crystal material, wherein an area Occupied by said first projection pattern in each pixel and an area occupied by said domain boundary regulating member in each pixel are different as viewed along a substrate normal, and the area occupied by said first projection pattern and the area occupied by said domain boundary regulating member are set to that a residual d.c. voltage between said first and second alignment films after an a.c. voltage is applied across said first and second electrodes becomes smaller than a residual d.c. voltage when the area occupied by said first projection pattern and the area occupied by said domain boundary regulating member are made equal.

8. A liquid crystal display device according to claim 7, wherein said domain boundary regulating member is a second projection pattern lower than said first projection pattern, and an area occupied by the second projection pattern in each pixel is larger than an area occupied by said first projection pattern in each pixel.

9. A liquid crystal display device according to claim 7, wherein said domain boundary regulating member is a second projection pattern made of material having a lower dielectric constant than said first projection pattern, and an area occupied by the second projection pattern in each pixel is smaller than an area occupied by said first projection pattern in each pixel.

10. A liquid crystal display device according to claim 7, wherein said domain boundary regulating member is a second projection pattern made of material having a higher resistivity than said first projection pattern, and an area occupied by the second projection pattern in each pixel is smaller than an area occupied by said first projection pattern in each pixel.

11. A liquid crystal display device according to claim 7, wherein said domain boundary regulating member is a slit formed in said second electrode, and an area occupied by the slit in each pixel is larger than an area occupied by said first projection pattern in each pixel.

12. A liquid crystal display device, comprising:

first and second substrates disposed in parallel and facing each other at some distance;

liquid crystal material with liquid crystal molecules having a negative dielectric constant anisotropy and filled in a space between said first and second substrates;

first and second electrodes respectively formed on inner surfaces of said first and second substrates and defining pixels;

a first projection pattern formed on a surface of said first electrode;

a second projection pattern formed on the inner surface of said second substrate and being narrower and higher than said first projection pattern, said second projection pattern together with said first projection pattern regulating the boundary of each domain in which the liquid crystal molecules tilt in a same direction;

a first alignment film formed on the inner surface of said first substrate, covering said first electrode and said first projection pattern, said first alignment film vertically directing the liquid crystal molecules in said liquid crystal material; and a second alignment film formed on the inner surface of said second substrate, covering said second electrode and said second projection pattern, said second alignment film vertically directing the liquid crystal molecules in said liquid crystal material.

13. A liquid crystal display device, comprising:

first and second substrates disposed in parallel and facing each other at some distance;

liquid crystal material with liquid crystal molecules having a negative dielectric constant anisotropy and filled in a space between said first and second substrates;

first and second electrodes respectively formed on inner surfaces of said first and second substrates and defining pixels;

a first projection pattern formed on a surface of said first electrode;

a second projection pattern formed on the inner surface of said second substrate and having a different width and a different material from said first projection pattern, said second projection pattern together with said first projection pattern regulating the boundary of each domain in which the liquid crystal molecules tilt in a same direction;

a first alignment film formed on the inner surface of said first substrate, covering said first electrode and said first projection pattern, said first alignment film vertically directing the liquid crystal molecules in said liquid crystal material; and a second alignment film formed on the inner surface of said second substrate, covering said second electrode and said second projection pattern, said second alignment film vertically directing the liquid crystal molecules in said liquid crystal material, wherein materials of said first and second projection patterns are set so that a residual d.c. voltage between said first and second alignment films after an a.c. voltage is applied across said first and second electrodes becomes smaller than a residual d.c. voltage when said first and second projection patterns are made of a same material.

* * * * *

UNITED STATES PATENT AND TRADEMARK OFFICE
CERTIFICATE OF CORRECTION

PATENT NO.    : 6,525,797 B2
DATED         : February 25, 2003
INVENTOR(S)   : Tsuda et al.

It is certified that error appears in the above-identified patent and that said Letters Patent is hereby corrected as shown below:

<u>Title page,</u>
Item [63], Related U.S. Application Data, after "PCT/JP00/00449", delete "April 24, 2000" and insert -- January 27, 2000 --.

Signed and Sealed this

Twenty-ninth Day of July, 2003

JAMES E. ROGAN
*Director of the United States Patent and Trademark Office*